(12) United States Patent
Sinclair

(10) Patent No.: US 10,625,448 B2
(45) Date of Patent: Apr. 21, 2020

(54) CURVED HEAT SHRINK TUBING AND METHODS OF MAKING THE SAME

(71) Applicant: The Boeing Company, Chicago, IL (US)

(72) Inventor: James R. Sinclair, Melbourne (AU)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 15/832,335

(22) Filed: Dec. 5, 2017

(65) Prior Publication Data

US 2019/0168427 A1 Jun. 6, 2019

(51) Int. Cl.

| | |
|---|---|
| *B29C 44/32* | (2006.01) |
| *B29C 63/34* | (2006.01) |
| *B29C 67/00* | (2017.01) |
| *B29C 69/00* | (2006.01) |
| *B29C 61/08* | (2006.01) |
| *B29C 53/08* | (2006.01) |
| *B29K 23/00* | (2006.01) |
| *B29K 105/02* | (2006.01) |

(52) U.S. Cl.
CPC .......... *B29C 44/321* (2016.11); *B29C 53/083* (2013.01); *B29C 61/08* (2013.01); *B29C 63/34* (2013.01); *B29C 67/0014* (2013.01); *B29C 69/008* (2013.01); *B29C 2791/003* (2013.01); *B29K 2023/16* (2013.01); *B29K 2105/02* (2013.01); *B29K 2995/0049* (2013.01)

(58) Field of Classification Search
CPC ..... B29C 44/321; B29C 53/083; B29C 61/08; B29C 67/0014; B29C 69/008
See application file for complete search history.

(56) References Cited

U.S. PATENT DOCUMENTS

| | | | | |
|---|---|---|---|---|
| 4,282,396 A | * | 8/1981 | Watine | H01R 4/72 174/84 R |
| 4,384,404 A | * | 5/1983 | Watine | H01R 4/723 29/871 |
| 5,271,975 A | * | 12/1993 | Solano | B29C 53/083 174/74 A |

(Continued)

FOREIGN PATENT DOCUMENTS

JP 2016105378 6/2016

OTHER PUBLICATIONS

Consolidated Label Co. "Shrink Sleeve Labels—Shrink Sleeves & Wraps," retrieved from [http://consolidatedlabel.com/custom-label-capabilities/print-products-processes/shrink-sleeve-labels] on Dec. 5, 2017, 4 pages.

(Continued)

*Primary Examiner* — Philip C Tucker
*Assistant Examiner* — John Blades
(74) *Attorney, Agent, or Firm* — Hanley, Flight & Zimmerman, LLC

(57) ABSTRACT

Curved heat shrink tubing and methods of making the same are described herein. An example method includes inserting heat shrink tubing into a tube, curving the tube, and deforming the heat shrink tubing, inside of the tube, to have a curved shape along a length of the heat shrink tubing where a first length of the heat shrink tubing along an outer radius of the curved shape is longer than a second length of the heat shrink tubing along an inner radius of the curved shape.

12 Claims, 7 Drawing Sheets

(56) References Cited

U.S. PATENT DOCUMENTS 5,862,962 A * 1/1999 Fuchs ................ B05B 11/0005
222/464.1
8,900,652 B1 12/2014 Caballero et al.

OTHER PUBLICATIONS

Passion Labels, "Shrink Sleeve Label Materials," retrieved from [https://www.passionlabels.com/shrink-sleeve-labels/shrink-label-material.html] on Dec. 5, 2017, 3 pages.
Clysar, "What I'm Wrapping," retrieved from [http://www.clysar.com/what-im-wrap] on Dec. 5, 2017, 1 page.
Wikihow, "How to Expand Heat Shrink Tubing," retrieved from [http://www.wikihow.com/Expand-Heat-Shrink-Tubing] on Dec. 5, 2017, 2 pages.
Stanmech Technologies Inc., "The Effect of Bottle Shape on Shrink Quality," retrieved from [https://www.stanmech.com/articles/the-effect-of-bottle-shape-on-shrink-quality] on Dec. 5, 2017, 4 pages.
European Patent Office, "Extended European Search Report", issued in connection with European Application No. 18209987.9 dated Apr. 3, 2019, 6 pages.

\* cited by examiner

US 10,625,448 B2

CURVED HEAT SHRINK TUBING AND METHODS OF MAKING THE SAME

FIELD OF THE DISCLOSURE

This disclosure relates generally to heat shrink films or wraps and, more particularly, to curved heat shrink tubing and methods of making the same.

BACKGROUND

Heat shrink films or wraps are used in many industries. For example, in packaging, heat shrink wraps are used to cover and/or seal objects for shipping and/or handling. In other industries, such as composite part manufacturing, heat shrink wraps may be used to cover the surfaces of mold tools or dies to prevent the mold material from inadvertently bonding (e.g., sticking) to the surfaces of the mold tools.

SUMMARY

An example method disclosed herein includes inserting heat shrink tubing into a tube, curving the tube, and deforming the heat shrink tubing, inside of the tube, to have a curved shape along a length of the heat shrink tubing where a first length of the heat shrink tubing along an outer radius of the curved shape is longer than a second length of the heat shrink tubing along an inner radius of the curved shape.

An example apparatus disclosed herein includes heat shrink tubing having a curved shape along a length of the heat shrink tubing such that a first length of the heat shrink tubing along an outer radius of the curved shape is longer than a second length of the heat shrink tubing along an inner radius of the curved shape. The heat shrink tubing is configured to shrink, upon application of heat, circumferentially to conform to a curved shape of an object at least partially covered by the heat shrink tubing.

An example method disclosed herein includes placing heat shrink tubing on a curved tool. The heat shrink tubing has a curved shape along a length of the heat shrink tubing such that a first length of the heat shrink tubing along an outer radius of the curved shape is longer than a second length of the heat shrink tubing along an inner radius of the curved shape. The example method also includes heating the heat shrink tubing to conform the heat shrink tubing to the curved tool.

Figure 1:
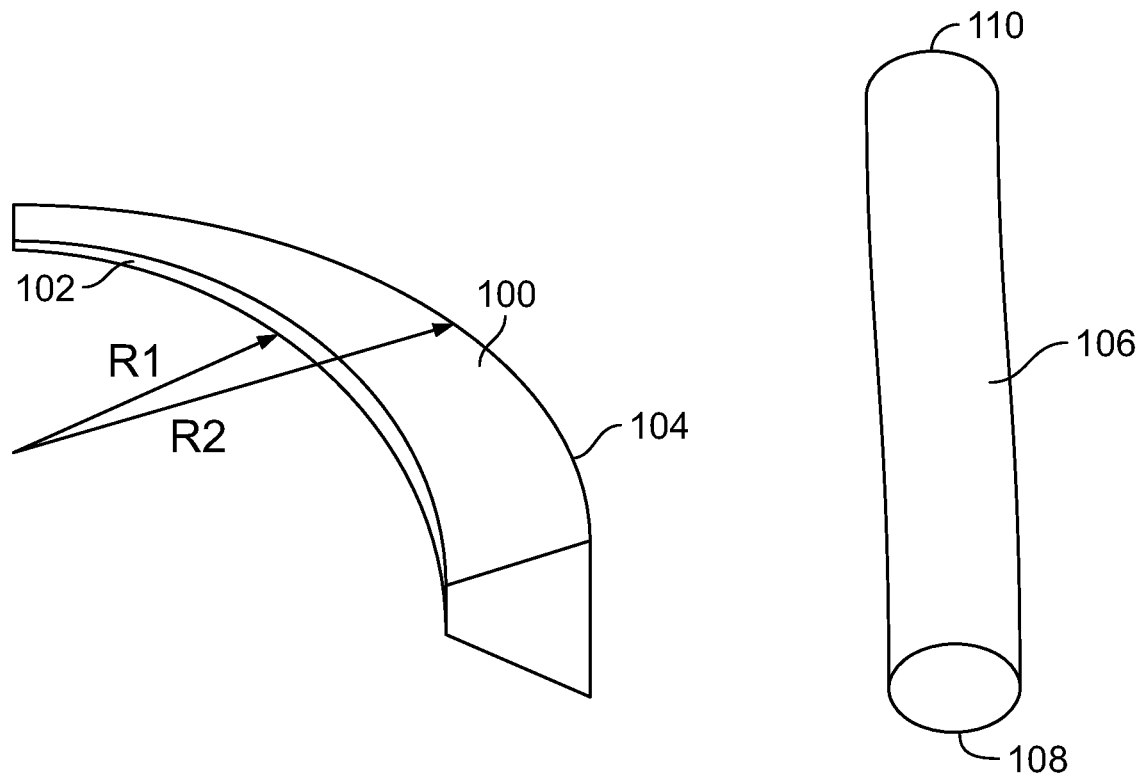
FIG. 1 illustrates a curved manufacturing tool and a known, straight heat shrink tubing that may be used to cover the tool.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are curved heat shrink tubing and methods of making the same. Example methods disclosed herein may be used to reshape (e.g., curve) heat shrink tubing to better conform to a shape of a desired object. Example curved heat shrink tubing may be used to cover curved objects, for example, and produce better conformance to the surfaces of the curved objects than straight heat shrink tubing or heat shrink tubing that does not otherwise substantially match the geometry of the object. By using heat shrink tubing that better conforms to the shape or geometry of a curved object, less defects (e.g., wrinkles) are formed in the heat shrink tubing along the surfaces of the curved object. As such, when a curved object is used to mold a part, for example, the curved heat shrink tubing reduces or eliminates markings (e.g., wrinkle impressions) that would otherwise be formed on the surface(s) of the molded part.

Heat shrink tubing is used in many industries, such as for covering tools for molding a part (e.g., a composite part). For example, FIG. 1 shows a tool 100 that may be used as an internal tooling for molding a part. In particular, a mold material (e.g., a composite material, fiberglass, carbon fiber, etc.) may be placed around the tool 100 to create an internal cavity matching the shape of the tool 100 and/or an external shape having a similar contour as the tool 100. The tool 100 of FIG. 1 may be used to form curved part, such as a part for a vehicle (e.g., an aircraft part). In FIG. 1, the tool 100 is an elongated structure that is curved along its length. In particular, an inner surface 102 of the tool 100 is curved along an inner radius R1 and an outer surface 104 of the tool 100 is curved along an outer radius R2, which is larger than R1. As such, the outer surface 104 is longer than the inner surface 102. In the illustrated example, the tool 100 has a trapezoidal cross-section. However, in other examples, the tool 100 may have a cross-section having another shape (e.g., a square, a rectangle, a triangle, a circle, etc.).

Prior to using the tool 100 to create the desired part, heat shrink tubing 106 (sometimes referred to as heat shrink film or plastic film) may be placed over the tool 100 to prevent the mold material from bonding (sticking) to the tool 100 and/or for forming a vacuum seal when creating the part. The heat shrink tubing 106 is a straight tube or sleeve of heat shrink material that may be pulled onto the tool 100. The heat shrink tubing 106 may be a relatively thin, flexible material, such as plastic (e.g., fluorinated ethylene propylene (FEP), polyolefin, etc.). The heat shrink tubing 106 has a first end 108 and a second end 110, which are both open. The heat shrink tubing 106 may be placed on the tool 100 by inserting an end of the tool 100 into one of the first or second ends 108, 110 of the heat shrink tubing 106 and then pulling the heat shrink tubing 106 along the tool 10, such that the tool 100 is disposed at least partially within the heat shrink tubing 106. The heat shrink tubing 106 may be any length desired to cover any desired length of the tool 100.

Figure 2:
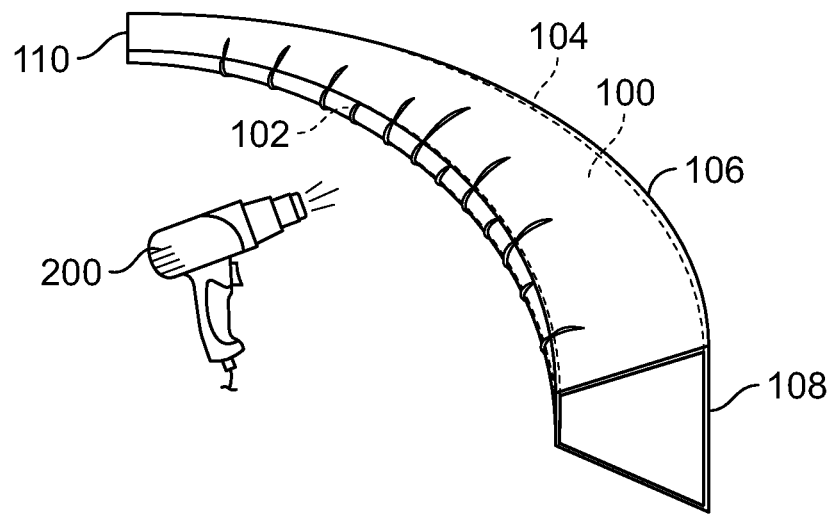
FIG. 2 shows the known straight heat shrink tubing of FIG. 1 covering the tool and being heated to shrink the straight heat shrink tubing onto the tool.

After the heat shrink tubing 106 is placed over the tool 100, heat is applied to the heat shrink tubing 106 as shown in FIG. 2 (sometimes referred to as a recovery operation). In FIG. 2, the heat shrink tubing 106 is pulled over the tool 100 such that the first end 108 is at or near one end of the tool 100 and the second end 110 is at or near the other end of the tool 100. Heat may be applied with one or more heat guns 200 that eject relatively warm air. The heat causes the heat shrink tubing 106 to shrink circumferentially onto the tool 100 (shown in dashed lines in FIG. 2), thereby conforming the heat shrink tubing 106 to the shape of the tool 100 and creating a tighter fit on the tool 100. However, the heat shrink tubing 106 does not shrink longitudinally. As a result, as shown in FIG. 2, when the heat shrink tubing 106 is heated, it does not form a substantially smooth surface along the inner surface 102 of the tool 100. Instead, defects (e.g., wrinkles) are formed in the heat shrink tubing 106 along the inner surface 102 of the tool 100. This is because the outer radius R2 of the tool 100 is longer than the inner radius R1. As such, the section or side of the heat shrink tubing 106 along the inner surface 102 tends to accumulate or bunch up rather than being pulled tight like the section or side of the heat shrink tubing 106 along the outer surface 104. As a result, when the tool 100 is used as an internal tool for a mold, the inner surface of the molded part has defects (e.g., matching markings) and, thus, is not smooth like the tool 100, which has the intended shape and texture to be formed. These defects (e.g., wrinkle impressions) in the part surface can also lead to stress concentration areas, defective parts, and/or other undesirable effects in the molded part.

Figure 3:
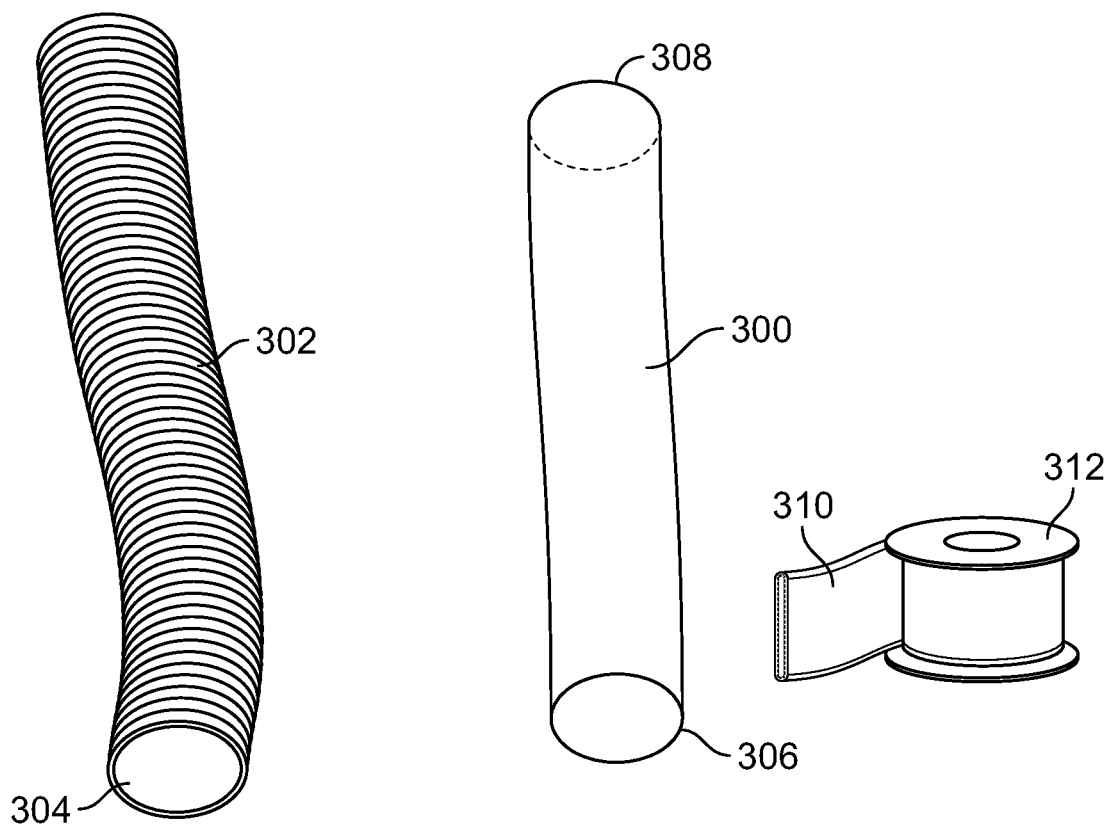
FIG. 3 illustrates an example heat shrink tubing and an example tube that may be used in an example operation to deform the shape of the example heat shrink tubing in accordance with the teachings of this disclosure.

FIG. 3 illustrates an example heat shrink tubing 300 and an example pipe or tube 302 that may be used in an example operation to curve the example heat shrink tubing 300 along its length. The tube 302 may be any semi-flexible tube that can be at least partially bent or curved (e.g., coiled) along its length. The tube 302 may be a plastic tube, for example, that substantially maintains its open form but is bendable along its length. In some examples, the tube 302 has a relatively smooth inner surface 304 (while the outer surface may be rough or non-smooth, for example).

The example heat shrink tubing 300 can be the same as the straight heat shrink tubing 106 from FIGS. 1 and 2. In the illustrated example, the heat shrink tubing 300 has a first end 306 and a second end 308 opposite the first end 306. The first and second ends 306, 308 are both open, thereby forming a tube or sleeve of heat shrink material (e.g., plastic film). The heat shrink tubing 300 has a substantially constant inner diameter (e.g., ±1%) (without stretching the heat shrink tubing 300 beyond its relaxed state). In other examples, the heat shrink tubing 300 can have a varying inner diameter. In the illustrated example, the heat shrink tubing 300 is shown in an open or expanded state. However, the heat shrink tubing 300 can be constructed of a relatively thin film that does not hold its shape unless supported by another structure. In some examples, the heat shrink tubing 300 is cut from a stock of straight heat shrink tubing 310, which may be supplied on a reel or spool 312, for example.

In an example operation, one end of the heat shrink tubing 300 is closed or sealed. For example, the second end 308 may be closed by melting the material at the second end 308 together, by clamping, or pinching the second end 308 closed (e.g., with a clamp or other fastening device), etc. Then, the heat shrink tubing 300 is inserted, longitudinally, into the tube 302. The tube 302 has an inner diameter that is the same as (or about the same as) an outer diameter of the heat shrink tubing 300. When the heat shrink tubing 300 is inflated, the heat shrink tubing 300 expands circumferentially (e.g., to substantially fill the inner diameter of the tube 302) and stretches longitudinally. In other examples, the tube 302 has an inner diameter that is larger (e.g., about 2% larger) than an outer diameter of the heat shrink tubing 300.

Figure 4:
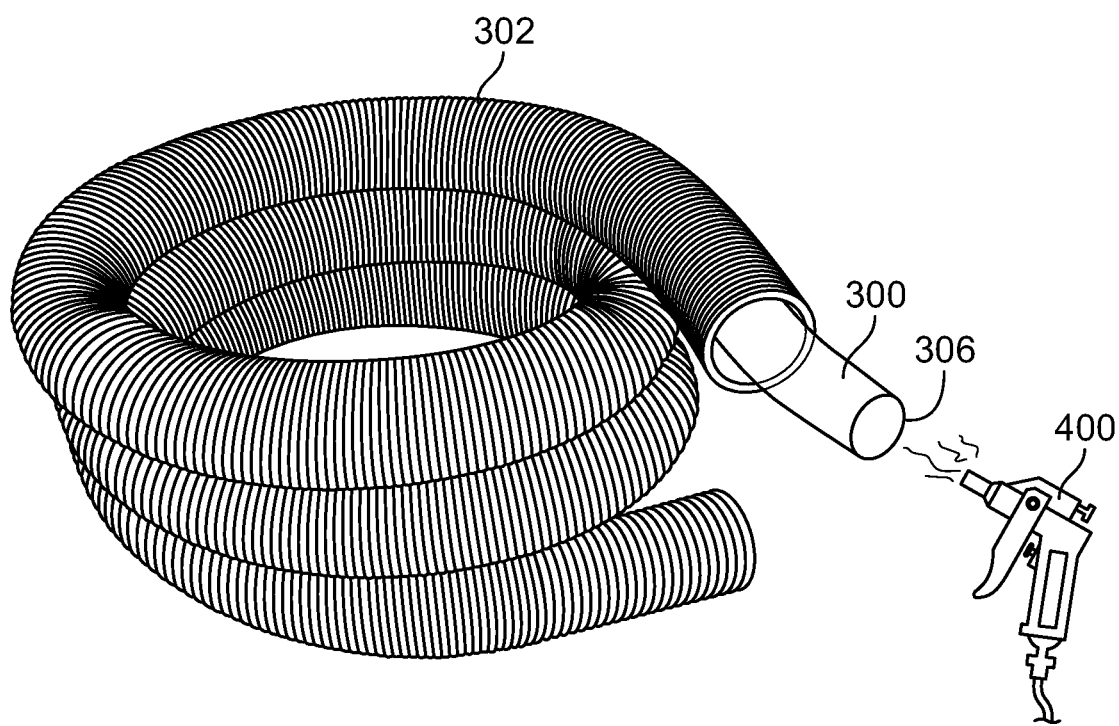
FIG. 4 shows the example tube of FIG. 3 in a coil and the example heat shrink tubing from FIG. 3 within the example tube during an example operation to deform the shape of the example heat shrink tubing.

The tube 302 can then be coiled into one or more turns, for example, as shown in FIG. 4. In other examples, the tube 302 can be coiled first and then the heat shrink tubing 300 can be inserted into the tube 302. In some examples, the tube 302 is longer than the heat shrink tubing 300. Then, the heat shrink tubing 300 is deformed (e.g., stretched) within the tube 302. The heat shrink tubing 300 is deformed, such as by injecting pressurized fluid (e.g., a gas, such as air, a liquid, etc.) into the first end 306 (the open end) of the heat shrink tubing 300, while securing the first end 306 of the heat shrink tubing 300, which causes the heat shrink tubing 300 to expand (because the second end 308 of the heat shrink tubing 300 is sealed) and stretch within the tube 302. As the heat shrink tubing 300 stretches within the tube 302, the heat shrink tubing 300 forms a curved shape or contour along its length. In particular, the section or side of the heat shrink tubing 300 along the outer radius of the coiled tube 302 is stretched (lengthened) more than the section or side of the heat shrink tubing 300 along the inner radius of the coiled tube 302. The tube 302 acts to direct or guide the second end 308 of the heat shrink tubing 300 along a curved path as the heat shrink tubing 300 stretches (lengthwise), which enables a curve to be formed in the heat shrink tubing 300 along its length.

The heat shrink tubing 300 is inflated at a pressure (e.g., a threshold pressure) that is sufficient to stretch the heat shrink tubing 300. In some examples, the pressure can be selected based on the thickness and/or the material of the heat shrink tubing 300 (e.g., a higher pressure may be used for a thicker or stiffer material). In some examples, the heat shrink tubing 300 is inflated as a pressure of about 100 pounds per square inch (PSI). In other examples, the heat shrink tubing 300 is inflated at a pressure that is higher or lower. Additionally or alternatively, the pressure can be applied for a threshold time that is sufficient to enable the heat shrink tubing 300 to stretch within the tube 302. In some examples, pressure is supplied for about 10 seconds. In other examples, the pressure may be applied for a longer or shorter period of time.

FIG. 4 also shows an example air compressor nozzle 400 that can be inserted into the first end 306 of the heat shrink tubing 300 to inject pressurized air into the heat shrink tubing 300 to inflate and stretch the heat shrink tubing 300 in the tube 302. In other examples, other devices may be used to pressurize the heat shrink tubing 300 within the tube 302. In the illustrated example, the tube 302 is positioned or arranged in a coiled shape (e.g., a first coil configuration) having approximately three complete turns or rotations. However, in other examples, the tube 302 can be coiled more or fewer turns. For example, the tube 302 can be curved to form only one turn or less than one turn (e.g., a curve that does not turn back on itself). In other examples, the tube 302 can be positioned to form many turns, such as fifty turns. Depending on the length of the heat shrink tubing 300, the tube 302 may be longer or shorter.

Figure 5:
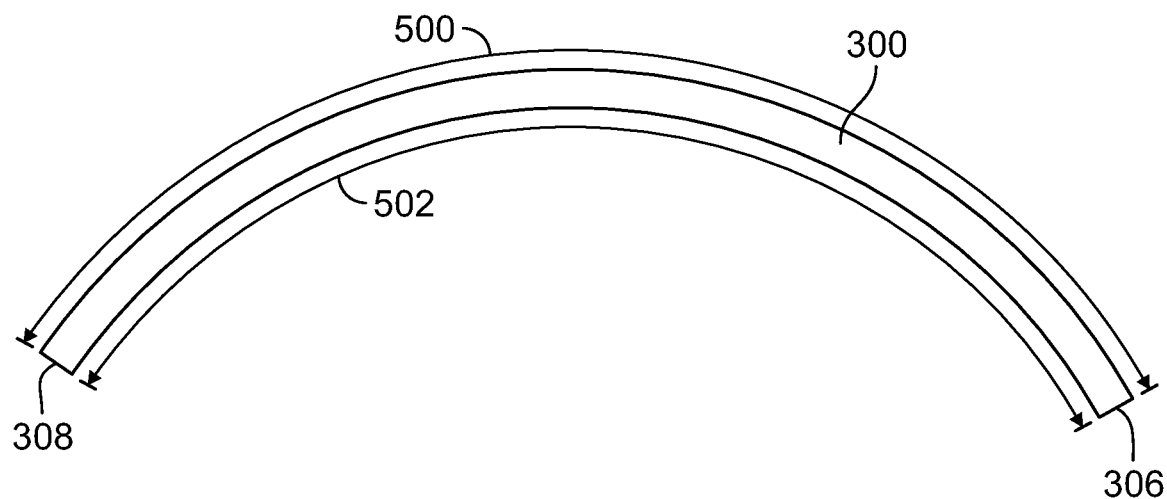
FIG. 5 is a side view of the example heat shrink tubing of FIG. 4 having a curved shape after the example operation of FIG. 4.

Then, after the heat shrink tubing 300 has been stretched a desired amount, the heat shrink tubing 300 can be depressurized (e.g., by ceasing operation of the air compressor nozzle 400), the tube 302 can be uncoiled, and the heat shrink tubing 300 can be removed. In other examples, the heat shrink tubing 300 can be removed without uncoiling the tube 302. The resulting heat shrink tubing 300 is formed into a curved shape, referred to herein as curved heat shrink tubing. For example, FIG. 5 is side view of the heat shrink tubing 300 showing the curved shape along the length of the heat shrink tubing 300 between the first end 306 and the second end 308. As shown, a first length 500 of the heat shrink tubing 300 along an outer radius of the curved shape is longer than a second length 502 of the heat shrink tubing 300 along an inner radius of the curved shape. In other words, the outer radius section or side of the heat shrink tubing 300 has been stretched or lengthened more than the inner radius section or side of the heat shrink tubing 300. The heat shrink tubing 300 is permanently deformed into the curved shaped (unless another operation is used to deform the heat shrink tubing 300 to another shape and/or the heat shrink tubing 300 is heated above a threshold temperature). In other words, the heat shrink tubing 300 retains the curved shape after the example operation.

In another example, the heat shrink tubing 300 can be deformed by depressurizing the tube 302 instead of pressurizing the heat shrink tubing 300. For example, the second end 308 of the heat shrink tubing 300 can be sealed, the heat shrink tubing 300 can be inserted into the tube 302, and the tube 302 can be curved to the desired curvature. The first end 306 of the heat shrink tubing 300 can be sealed and secured to one end of the tube 302 (or the first end 306 of the heat shrink tubing 300 may be pulled over the end of the tube 302 to seal the end of the tube 302). The ends of the tube 302 can be sealed (e.g., via mastic or sealant tape), and a vacuum can be applied to the inside of the tube 302, which evacuates the air between the heat shrink tubing 300 and the tube 302, thereby causing the heat shrink tubing 302 to expand and stretch within the tube 302, similar to the pressurization operation disclosed above.

Figure 6:
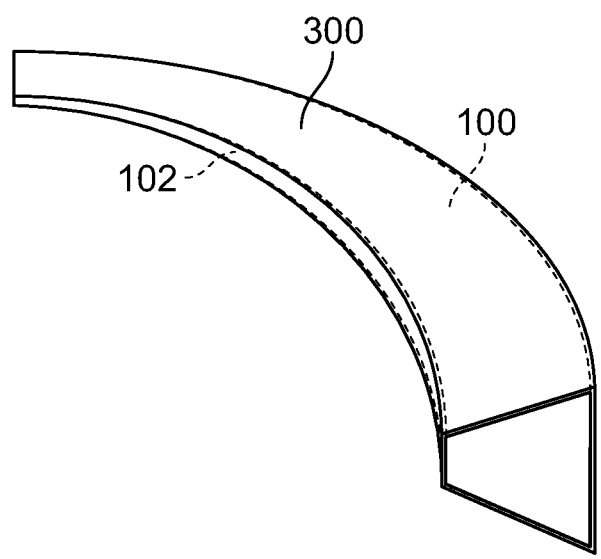
FIG. 6 shows the example curved heat shrink tubing of FIG. 5 on the tool of FIG. 1.

The curved heat shrink tubing 300 of FIG. 4 can then be used to cover or seal an object, such as the tool 100 of FIGS. 1 and 2. For example, as shown in FIG. 6, the curved heat shrink tubing 300 can be placed over the tool 100 and heated (e.g., by directing heated air onto the heat shrink tubing 300 with the heat gun 200 of FIG. 2) to shrink the heat shrink tubing 300 circumferentially onto the tool 100. However, as shown in FIG. 6, because the curved shape of the heat shrink tubing 300, no noticeable defects (e.g., wrinkles) are formed along the inner surface 102 of the tool 100 when heating and shrinking the heat shrink tubing 300 onto the tool 100 as seen with the known straight heat shrink tubing 106 in FIGS. 1 and 2 and/or heat shrink tubing that does not otherwise substantially match the shape/geometry of an object to be covered. In some examples, the heat shrink tubing 300 also shrinks or compresses longitudinally. As such, the heat shrink tubing 300 forms a relatively tight fitting, smooth film or cover on the tool 100. Thus, when using the tool 100 to mold a part, the inner surface of the part does not have significant inconsistencies, such as markings (e.g., wrinkle impressions), as seen when using known straight heat shrink tubing or heat shrink tubing that does not otherwise substantially matching the geometry of the tool 100.

Figure 7A:
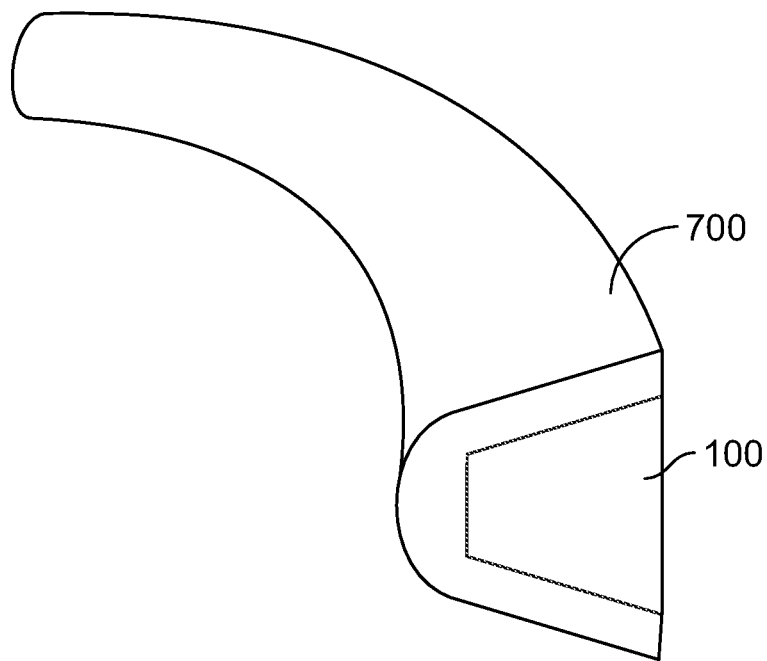
FIG. 7A shows an example part that may be molded using the tool of FIG. 6.
Figure 7B:
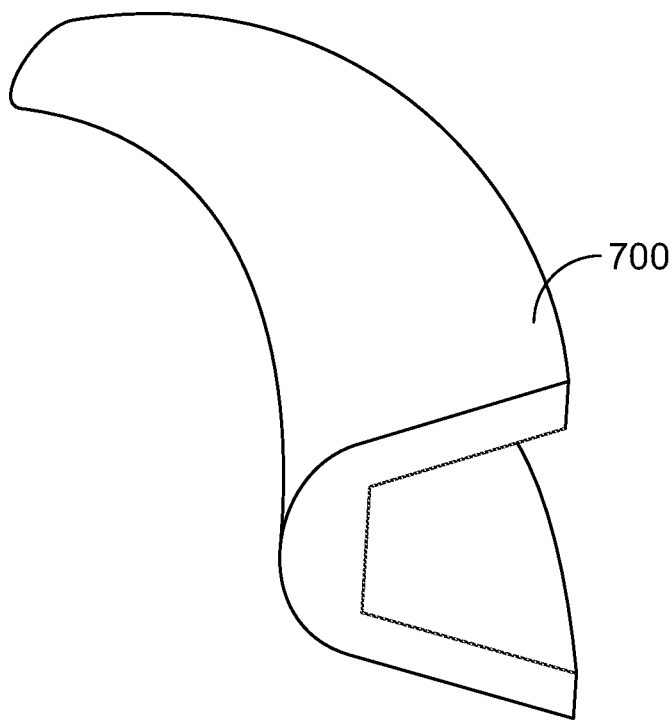
FIG. 7B shows the example part of FIG. 7A after the tool has been separated from the example part.

For example, FIG. 7A shows an example part 700 being molded using the tool 100. Prior to molding the part 700, the tool 100 is covered by a heat shrink tubing, such as the curved heat shrink tubing 300 of FIGS. 5 and 6. In some examples, mold material, such as a composite material (e.g., fiberglass, carbon fiber, etc.) or any other conformable material, is deposited (e.g., manually or via an automate machine) onto the tool 100 to form the part 700. Once the material cures (e.g., after a threshold time, via light irradiation, etc.), the tool 100 is separated from the part 700, as shown in FIG. 7B. In other examples, the tool 100 can be an internal mold and can be used with a separate external mold to form the part 700. For example, the tool 100 can be placed within an external mold, and the cavity between the external mold and the tool 100 can be filled with mold material. Once the mold material cures, the tool 100 and/or the external mold can be separated from the part 700.

In some examples, the curved heat shrink tubing 300 has a radius of curvature substantially matching the radius of curvature of the tool 100 (e.g., ±10%). For example, the first length 500 of the heat shrink tubing 300 can have a radius of curvature of about R1 (FIG. 1) and/or the second length 502 of the heat shrink tubing 300 can have a radius of curvature of about R2 (FIG. 1). In other examples, the curved heat shrink tubing 300 can be formed to have a larger or smaller radius of curvature than the tool 100. In some examples, when forming the curved heat shrink tubing 300 in the tube 302, the tube 302 is coiled at a radius of curvature that is smaller than the desired final radius of curvature for the heat shrink tubing 300 (because the heat shrink tubing 300, which can have elastic properties, may rebound after being removed from the tube 302).

Figure 8A:
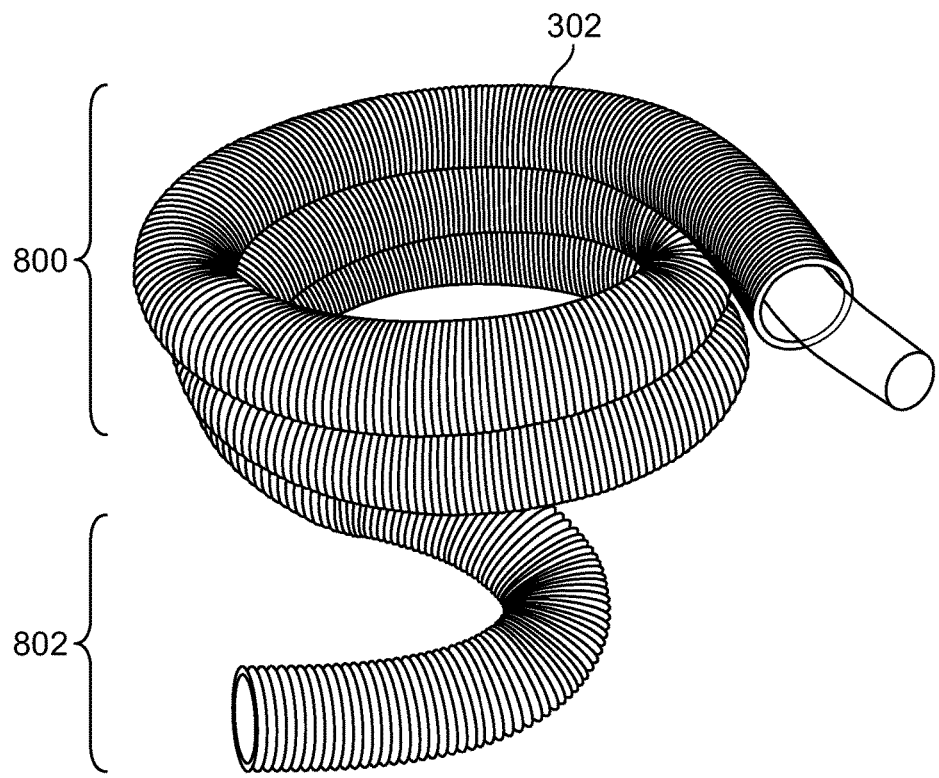
FIG. 8A shows the example tube of FIG. 3 in another configuration that may be used to deform the shape of the example heat shrink tubing.
Figure 8B:
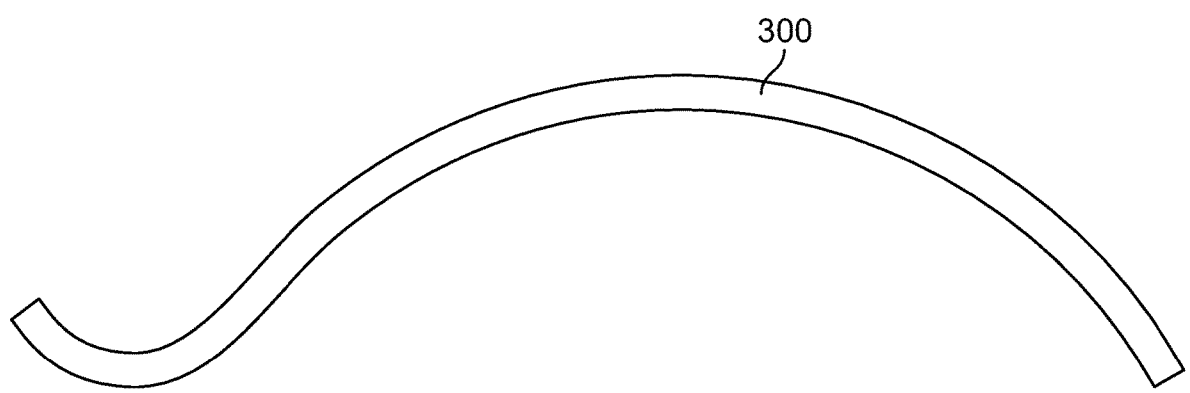
FIG. 8B is a side view of the example heat shrink tubing after being deformed in the tube of FIG. 8A.

In some examples, such as in FIG. 4, the tube 302 can be positioned in a coiled shape having a substantially constant radius of curvature (e.g., a substantially constant inner radius and/or outer radius) between the two ends (e.g., ±10%). In other examples, the tube 302 can be arranged in a shape having different or varying radii. For example, in FIG. 8A, a first section 800 of the tube 302 is curved at a first radius of curvature and a second section 802 of the tube 302 is curved as a second radius of curvature (in an opposite direction) different than the first radius of curvature, thereby forming a curved heat shrink tubing with different radiuses of curvature. FIG. 8B is a side view showing the shape of the example heat shrink tubing 300 created using configuration of the tube 302 in FIG. 8A, for example. Additionally or alternatively, after the heat shrink tubing 300 is stretched in one operation in the tube 302, the tube 302 can be arranged or positioned in another shape or configuration and the heat shrink tubing 300 (or a portion of the heat shrink tubing 300) can be stretched again (e.g., in the same direction or another direction). As such, complex geometries and curves can be formed using the tube 302 and the example operations disclosed herein.

In some examples, the heat shrink tubing 300 is constructed at least partially of fluorinated ethylene propylene (FEP), which is a durable material with heat shrinking capabilities that also avoids bonding (e.g., sticking) to mold material, such as composite mold material, such that the heat shrink tubing 300 can be released from the surface(s) of the cured part. In some instances, FEP is also advantageous for forming a vacuum seal when molding the part. Additionally or alternatively, the heat shrink tubing 300 can be constructed of one or more other materials, such as polyolefin, polyvinyl chloride (PVC), polyethylene, polypropylene, and/or any other material that can be conformed (e.g., via a heating and shrinking process) to a surface of an object and that avoids bonding to mold material, for example. The material of the heat shrink tubing 300 may be selected based on one or more factors, such as processing temperature of the part to be molded, compatibility between the material and the composition of the part (e.g., to avoid bonding), compatibility between the material and the composition of the tool or object being covered by the material, etc. In some examples, the heat shrink tubing 300 is transparent or semi-transparent. In other examples, the heat shrink tubing 300 is opaque. In some examples, prior to using the heat shrink tubing 300, the previously sealed second end 308 may be re-opened or cut off to form an open end. In other examples, the second end 308 may be left sealed or closed.

While some of the example curve tubing disclosed herein are described in connection with a heat shrinkable material, the example operations disclosed herein can be performed with other types of materials, non-heat shrinkable materials, to result in a similar structure. For example, other types of straight tubular films or wraps (e.g., a stretch wrap, a tubular plastic film, etc.) can be inserted into the tube 302 and deformed in a similar manner to alter the shape of the wrap. Further, while the example heat shrink tubing 300 is described in connection with tooling for manufacturing a part, the example heat shrink tubing and methods for making the same disclosed herein can be used in any other industry (e.g., medical, aerospace, energy, automotive, fluids, electrical) and/or for any other purpose.

Figure 9:
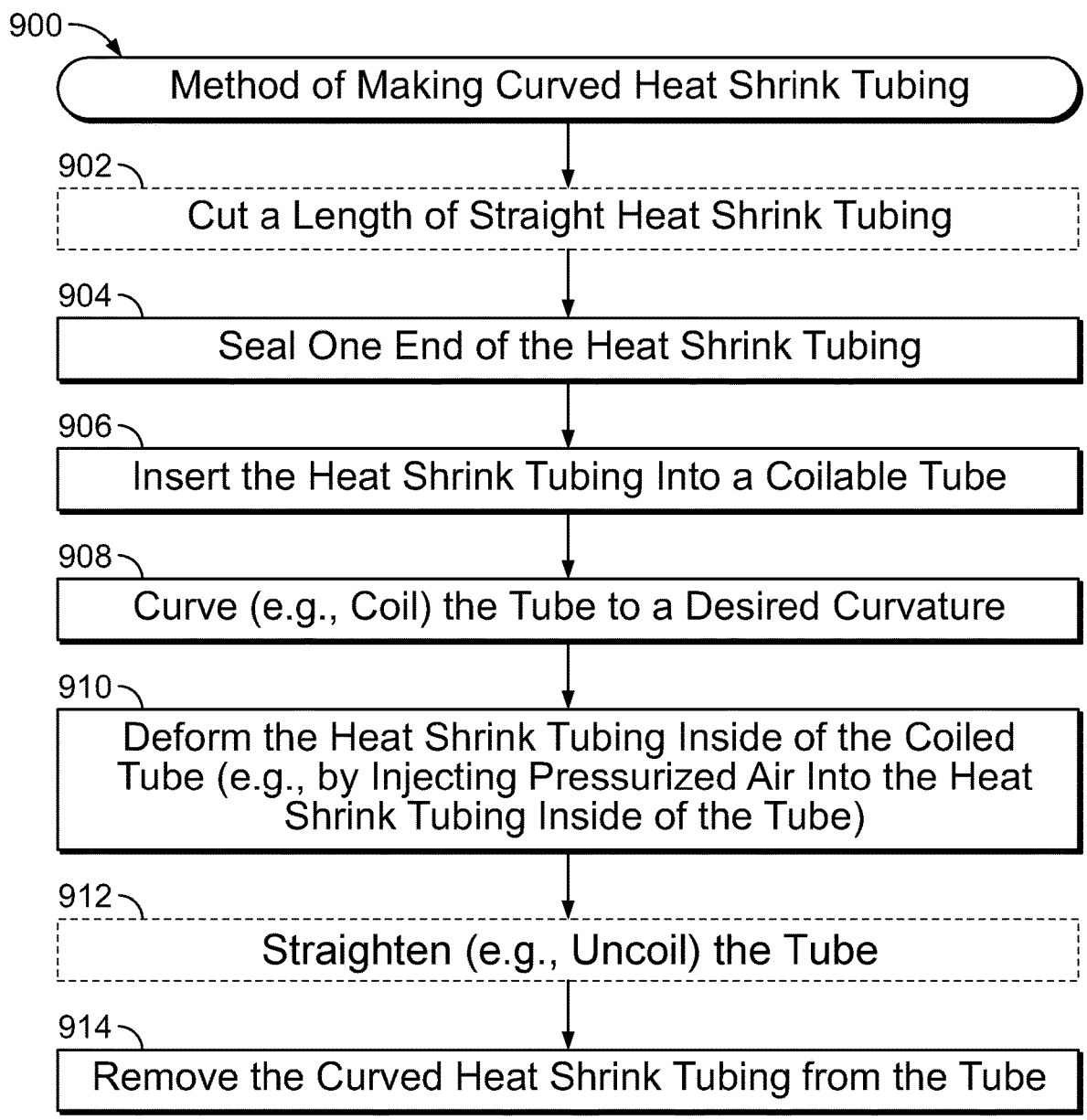
FIG. 9 is a flowchart representative of an example method of making a curved heat shrink tubing.

FIG. 9 is a flowchart representative of an example method that can be performed to make a curved heat shrink tubing, such as the curved heat shrink tubing 300 of FIG. 5. In some examples, the example method 900 includes, at block 902, cutting a length of straight heat shrink tubing. For example, as shown in FIG. 3, the heat shrink tubing 300 could have been cut from the stock of straight heat shrink tubing 310 on the spool 312. The heat shrink tubing 300 can be cut to any desired length. At block 904, the example method 900 includes sealing one end of the heat shrink tubing. For example, with the heat shrink tubing 300 of FIG. 3, the first end 306 or the second end 308 can be sealed and/or otherwise closed. The end of the heat shrink tubing can be sealed by melting (e.g., fusing) the material at the end to form a closed end, taping the end closed, pinching the end with a clip or other fastener, etc.

At block 906, the example method 900 includes inserting the heat shrink tubing into a coilable (e.g., flexible) tube. For example, in FIG. 4, the heat shrink tubing 300 is inserted into the tube 302. At block 908, the example method 900 includes curving (e.g., coiling) the tube to a desired curvature. For example, in FIG. 4, the tube 302 is coiled into multiple turns. In other examples, the tube 302 can already be coiled, and the heat shrink tubing 300 can be inserted into the coiled tube 302. In some examples, the tube 302 is coiled at a radius of curvature that is smaller than the desired curve to be formed in the heat shrink tubing 300.

At block 910, the example method 900 includes deforming the heat shrink tubing inside of the coiled tube. In some examples, the heat shrink tubing is deformed inside of the coiled tube by injecting pressurized fluid, such as air, into the heat shrink warp tubing, which causes the heat shrink tubing to expand and stretch inside of the tube. For example, in FIG. 4, the heat shrink tubing 300 is pressurized (via the air compressor nozzle 400), which causes the heat shrink tubing 300 to inflate and stretch (lengthen) within the coiled tube 302. As a result, the heat shrink tubing 300 is stretched or deformed into a curved shape, where the first length 500 (FIG. 5) of the heat shrink tubing 300 along the outer radius of the curved shape is longer than the second length 502 (FIG. 5) of the heat shrink tubing 300 along an inner radius of the curved shape. In other examples, the heat shrink tubing 300 can be deformed within the tube 302 using another operation (e.g., by depressurizing the tube 302) and/or using another device (e.g., a rigid device or an inflatable device that may be inserted into the heat shrink tubing 300). In some examples, the method 900 can include positioning (e.g., coiling) the tube 302 or a portion of the tube 302 into another coil configuration or shape (e.g., a second coiled configuration) having a different radius of curvature than the first coil and deforming (e.g., by injecting pressurized air) the heat shrink tubing within the tube 302 while the tube 302 is in the second coil configuration. After the desired deforming, the deforming operation can be ceased (e.g., the application of the pressurized air may be ceased).

In some examples, the example method 900 includes, at block 912, straightening (e.g., uncoiling) the tube, and at block 914, the example method 900 includes removing the curved heat shrink tubing from the tube. In other examples, the heat shrink tubing can be removed from the tube without uncoiling the tube. In some examples, it can be desirable to open the sealed end of the heat shrink film or cut it off. As such, the example method can include opening the sealed end (e.g., by unclipping the sealed end) of the heat shrink tube or cutting off the sealed end. The resulting heat shrink tubing has a curved shape along its length, which can then be used with to cover or seal a curved object (e.g., a tool).

Figure 10:
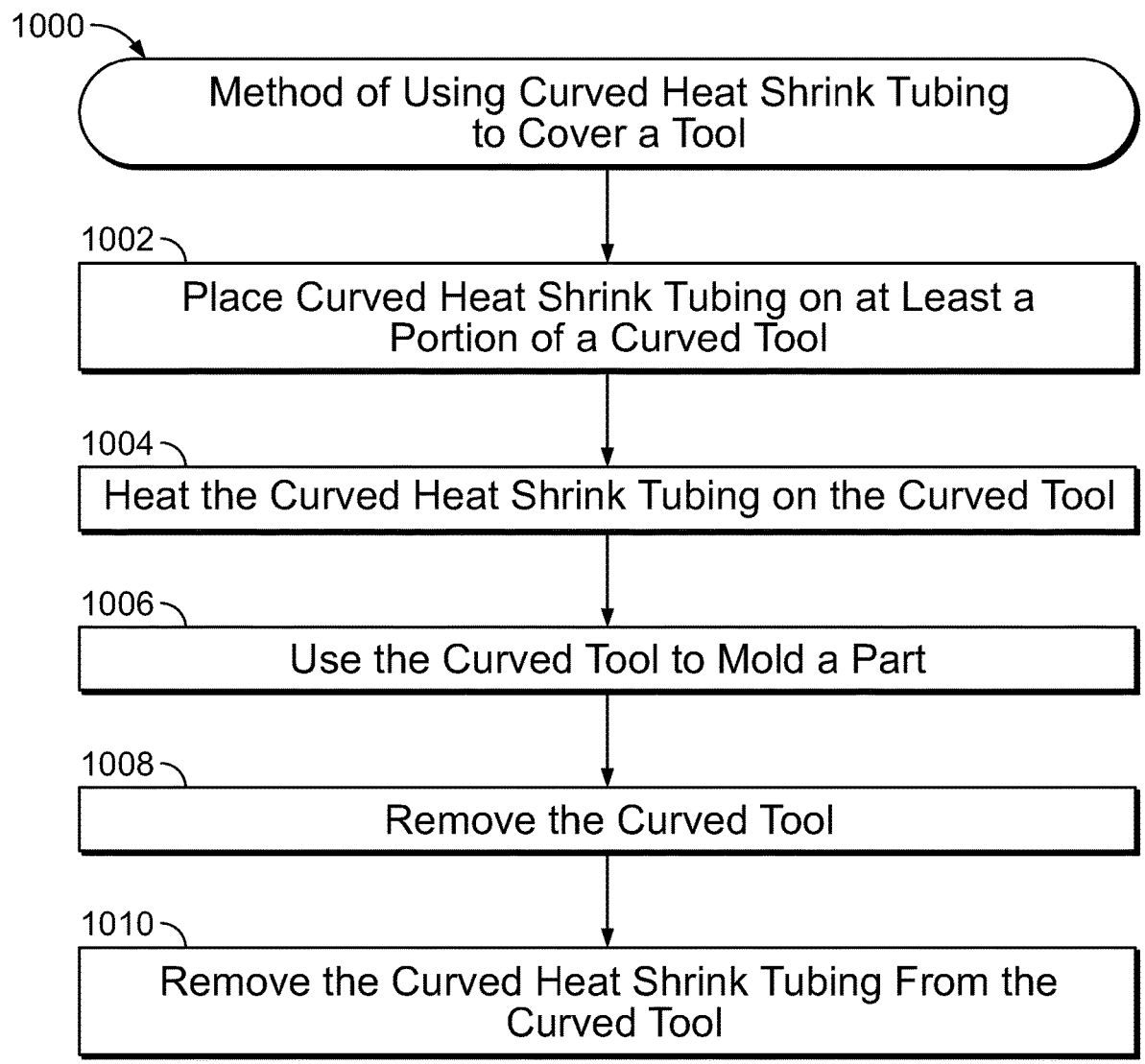
FIG. 10 is a flowchart representative of an example method of using an example curved heat shrink tubing to cover an example tool.

FIG. 10 is a flowchart representative of an example method 1000 of using curved heat shrink tubing, such as the heat shrink tubing 300 of FIGS. 5 and 6, to cover a tool or other object. At block 1002, the example method 800 includes placing curved heat shrink tubing on at least a portion of a curved tool. For example, as shown in FIG. 6, the curved heat shrink tubing 300 can be pulled over the tool 100 (in an orientation such that the curved shape of the heat shrink tubing 300 aligns with the curve of the tool 100).

At block 1004, the example method 1000 includes heating the curved heat shrink tubing on the curved tool. For example, the heating gun 200 (FIG. 2) can be used (by a person and/or via an automated device) to expel hot air at the heat shrink tubing 300. The heat causes the material of the heat shrink tubing 300 to shrink or compress, circumferentially and longitudinally, on the tool 100, thereby conforming to the shape of the tool 100 and forming a relatively smooth surface along the tool 100.

At block 1006, the example method 1000 includes using the curved tool (with the heat shrink warp tubing) to mold a part (e.g., the part 700 of FIGS. 7A and 7B). For example, the tool 100 can be used as an internal tool for molding a composite part. In some examples, the tool 100 is used to form a part for a vehicle (e.g., a part for an aircraft, a part for a car, a part for a boat, etc.). However, in other examples, the example curved heat shrink tubing 300 can be used with any other type of tool or die for forming any type of molded part. At block 1008, the example method 1000 includes separating the curved tool from the molded part, such as by removing the curved tool and/or removing the mold from around the curved tool. At block 1010, the example method 1000 includes removing the curved heat shrink tubing from the curved tool. The example method 1000 may be performed each time the curved tool is used. The heat shrink tubing prevents the mold material from bonding to the tool during the molding process. Further, the heat shrink tubing can be used to create a vacuum seal (e.g., which helps control molded part thickness and prevents porosity in the part) that is required for the fabrication of the molded part.

From the foregoing, it will be appreciated that example methods, apparatus, and articles of manufacture have been disclosed that enable curved heat shrink tubing to be formed from straight heat shrink tubing. Example curved heat shrink tubing can be used to heat shrink on a curved tool without leaving significant defects (e.g., wrinkles) in the surface of the heat shrink tubing, as seen in known straight heat shrink tubing applications. Thus, example curved heat shrink tubing reduce or eliminate markings on a surface of a molded part, thereby enabling smoother surface finishes on the molded part. As such, in some instances, costs are saved by not having to perform additional processes to smooth the surfaces of a molded part.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A method comprising:
   inserting heat shrink tubing into a tube;
   curving the tube; and
   deforming the heat shrink tubing, inside of the tube, to have a curved shape along a length of the heat shrink tubing where a first length of the heat shrink tubing along an outer radius of the curved shape is longer than a second length of the heat shrink tubing along an inner radius of the curved shape.

2. The method of claim 1, wherein deforming the heat shrink tubing includes injecting pressurized fluid into an end of the heat shrink tubing to at least partially inflate the heat shrink tubing within the tube, thereby causing the heat shrink tubing to expand and deform within the tube to form the curved shape.

3. The method of claim 2, further including, prior to inserting the heat shrink tubing into the tube, sealing one end of the heat shrink tubing.

4. The method of claim 1, wherein curving the tube includes positioning the tube in a coiled shape.

5. The method of claim 4, wherein the coiled shape includes multiple turns of the tube.

6. The method of claim 1, wherein the heat shrink tubing has a substantially constant inner diameter.

7. The method of claim 1, wherein an inner diameter of the tube is larger than an outer diameter of the heat shrink tubing.

8. The method of claim 1, wherein the heat shrink tubing is inserted into the tube before curving the tube.

9. The method of claim 1, further including:
   straightening the tube; and
   removing the heat shrink tubing from the tube.

10. The method of claim 1, further including, prior to inserting the heat shrink tubing into the tube, cutting the heat shrink tubing from a stock of straight heat shrink tubing.

11. The method of claim 1, wherein curving the tube includes coiling the tube into a first coil configuration, and deforming the heat shrink tubing includes deforming the heat shrink tubing inside of the tube while the tube is in the first coil configuration, and further including:
   coiling the tube into a second coil configuration having a different radius of curvature than the first coil configuration; and
   deforming the heat shrink tubing within the tube while the tube is in the second coil configuration.

12. The method of claim 1, wherein the heat shrink tubing is constructed at least partially of fluorinated ethylene propylene (FEP).

* * * * *